July 14, 1931.   C. L. PATTERSON   1,814,183
PIPE COUPLING AND TOOL JOINT
Filed May 20, 1929
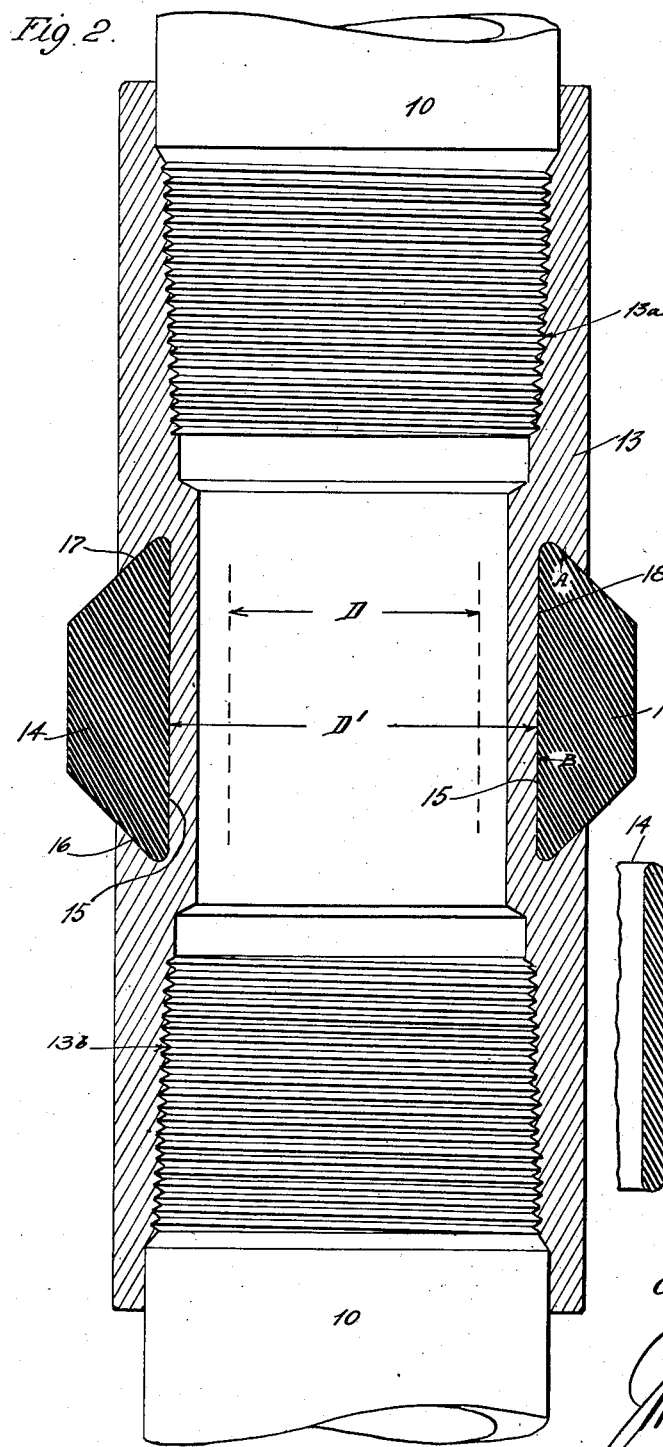
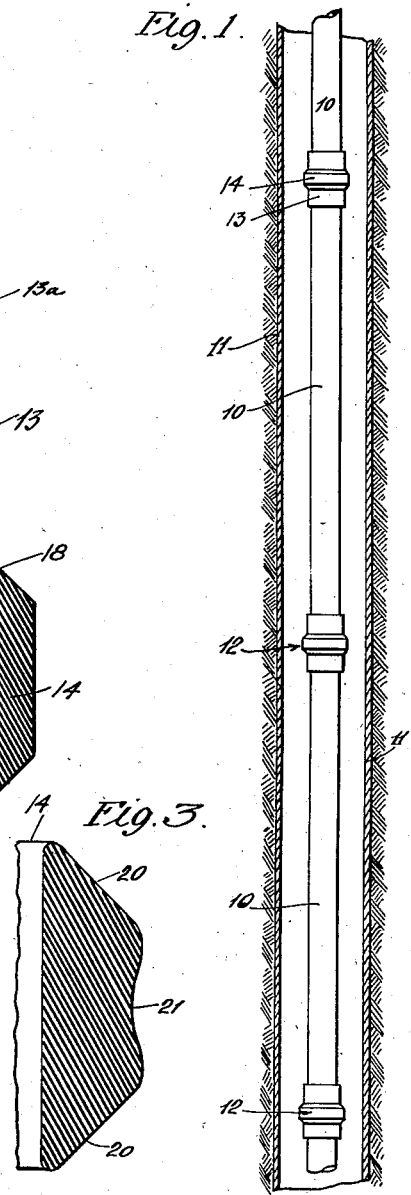
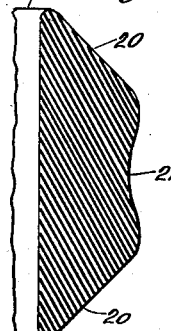
Inventor.
Claude. L. Patterson.
Attorney.

Patented July 14, 1931

1,814,183

UNITED STATES PATENT OFFICE

CLAUDE L. PATTERSON, OF LOS ANGELES, CALIFORNIA, ASSIGNOR TO PATTERSON BALLAGH CORPORATION, OF LOS ANGELES, CALIFORNIA, A CORPORATION OF CALIFORNIA

PIPE COUPLING AND TOOL JOINT

Application filed May 20, 1929. Serial No. 364,385.

The present invention is concerned generally with pipe couplings and tool joints for oil well tubing, and relates more particularly to a combination coupling and cushion joint for protecting the tubing and casing during pumping and drilling operations.

In rotary drilling operations in wells of considerable depth and in drilling crooked holes, rotation of the drill pipe is accompanied by its lateral or whipping movement against the well casing, with the result that both the drill pipe joints and the casing are subjected to destructive impact and wear. Also in pumping operations in crooked wells, portions of the tubing or pumping pipe are constantly subjected to reciprocating engagement with the casing, with resultant wear particularly on the pipe couplings. Such destructive action of such pipes has been prevented, or at least minimized, by the use of cushion or buffer rings of resilient material such as rubber, placed about the pipe at suitable vertically spaced intervals, the cushion rings engaging the casing upon lateral or longitudinal movement of the pipe and taking up the resultant impact and wear. In one instance a cushion ring of this nature heretofore has been placed on each section of pipe between couplings, the ring having an outside diameter greater than that of the couplings, and being permitted to move vertically between the confining couplings. According to another type of cushion mounting, the resilient ring is mounted upon sectional couplings, the parts of the couplings being adapted to be screwed together to retain the cushion therebetween.

It is a general purpose of the present invention to provide means for mounting such cushion rings on the drill or other pipe, and more particularly a combination coupling and cushion joint, whereby certain difficulties and disadvantages in the heretofore used methods of cushioning the pipe are overcome. In attaining these ends, I provide, in a common type of pipe coupling comprising a single part, an annular recess in the coupling and within which the cushion ring is carried, the recess and ring being shaped to form substantially a dovetail joint. The internal diameter of the ring is less than the diameter of the coupling at the base of the recess, and the ring preferably is somewhat longer than the width of the coupling recess. As a result, the ring is caused to securely grip the collar upon being radially expanded and tensioned, and axially compressed within the recess, and as will later be seen, certain advantageous results are gained by maintaining the ring under tension and in compressed condition in a joint of this particular nature.

An advantage of the present method of mounting the cushion rings over that in which the rings are merely placed on the pipe sections and confined between successive couplings, resides in the fact that in the present case, the rings are securely held in spaced relation and the ends of the rings are protected so as to prevent their being cut away by abrasive materials or rough projections in the casing and from becoming stripped from the pipe. Instead of employing sectional couplings to mount the cushion rings, with the attendant disadvantage of using additional threaded joints that may become unscrewed during operations, according to the invention I mount the ring on a single part coupling which may be annularly recessed to take the cushion ring, by a simple machining operation.

The various features and details of the invention will be understood most readily from the following detailed description throughout which reference is had to the accompanying drawings, in which:

Figure 1 is a diagrammatic sectional view showing the pipe string within the well casing, the pipe sections being joined with the present type of coupling;

Fig. 2 is an enlarged section taken through one of the coupling joints; and

Fig. 3 is a section taken through the cushion ring to illustrate its shape in expanded form and before its being placed on the coupling.

In Fig. 1, the drilling or pumping pipe string comprising sections 10 is shown within the well casing 11, the pipe sections being joined by means of the coupling joints generally indicated at 12. As shown in detail in Fig. 2, the coupling 13 comprises the box ends into which the pipe sections are threaded at 13a, 13b the coupling being recessed intermediate its ends at 15 to receive the annular cushion 14, the latter being made of a suitable resilient material such as high grade oil resistant rubber. It will be understood that upon lateral whipping movement of the pipe within the casing during drilling operations, the cushion rings engage the casing, thereby taking up the resulting impact and preventing destructive wear of the pipe couplings and casing. Also in pumping operations and in which the tubing is reciprocated vertically with portions thereof in engagement with the casing where the hole is crooked, and during the lowering and raising of the pipe string, the cushion rings engage the casing and prevent the couplings from becoming worn through.

The annular recess 15 in the coupling preferably is shaped to form essentially a dovetail joint with the cushion ring 14, the spaced annular shoulders 16, 17, forming the sides of the recess, converging outwardly, and it may be noted at this point that preferably the converging sides of the recess are at an angle of substantially 45° with the base portion 18 of the recess. The cushion ring has sufficient elasticity to permit its being expanded over the coupling in the procedure of securing the ring within the dovetail recess. Normally, that is when removed from the recess 15, the ring is somewhat longer than the width of the recess, and thus to secure the ring in the position indicated, it is axially compressed upon being inserted between the inclined shoulders 16, 17. Also, normally the internal diameter of the cushion ring, as may be represented by the dimension D in Fig. 1, is less than the diameter D' at the base of recess 15, and as a result the ring is tensioned and caused to grip the collar tightly.

The shape of the cushion ring prior to its being placed on the coupling, is illustrated in Fig. 3. It will be noted that the sides 20 of the ring are inclined substantially at the angle of the sides of the coupling recess, and that the expanded ring has an outer annular concave face 21. By giving the outer face of the ring the concave shape illustrated, the tendency, upon axial compression of the ring and its subsequent exposure to oil or oil vapors, will be for the rubber compressed toward the center of the ring to spread outwardly and to expand to an extent such that the outer face of the ring will be practically straight as shown in Fig. 2. Upon being compressed between the annular inclined sides of the recess, the cushion ring is caused to be held securely therein both by virtue of its tendency to expand longitudinally in the direction of arrows A, into tight engagement with shoulders 16, 17, and also due to the tension of the ring causing it to be brought into tight gripping engagement radially inward in the direction of arrows B, with the inner annular face 18 of the recess. Thus the ring not only is secured against longitudinal movement on the coupling, but in addition is held so as to resist its outward radial flexure.

By shaping the ring to provide the inclined sides 20, it will be noted that the tendency for the ends of the ring to become engaged and cut away by projections or abrasive particles within the casing as would be the case should the shape of the ring be such as to form square shoulders projecting from the coupling, is materially reduced. Should the ring become engaged within the casing in a manner such that the ring would tend to be stripped from the coupling, its removal from the recess is prevented by virtue of the ends of the ring being held against outward displacement by the inclined sides of the recess.

I claim:

1. A pipe coupling embodying a single part, a pair of spaced annular and outwardly converging shoulders formed on said single coupling part, and a radially expanded and tensioned cushion ring carried on the coupling and axially compressed between said shoulders.

2. A pipe coupling embodying a single part and an axially compressed cushion ring carried in an annular recess in said coupling part, said recess and the cushion ring being shaped to form substantially a dovetail joint, and the ring having a normal inner diameter less than the base diameter of said recess.

3. A pipe coupling embodying a single part and an axially compressed cushion ring carried in an annular recess in said single coupling part, said recess and the cushion ring being shaped to form substantially a dovetail joint, and the ring having a normal inner diameter less than the base diameter of said recess, and an outer annular concave face.

4. A pipe coupling, the parts thereof comprising a pair of spaced annular and outwardly converging shoulders, and an axially compressed cushion ring between said shoulders, said ring having a normal inner diameter less than the outer diameter of the coupling between said shoulders.

In witness that I claim the foregoing I have hereunto subscribed my name this 18 day of April, 1929.

CLAUDE L. PATTERSON.